(12) United States Patent
Freelander

(10) Patent No.: US 8,724,801 B2
(45) Date of Patent: May 13, 2014

(54) MOUNT FOR A MOBILE MEDIA DEVICE

(76) Inventor: Michael Freelander, Nixa, MO (US)

( * ) Notice: Subject to any disclaimer, the term of this patent is extended or adjusted under 35 U.S.C. 154(b) by 188 days.

(21) Appl. No.: 13/490,097

(22) Filed: Jun. 6, 2012

(65) Prior Publication Data
US 2013/0327909 A1 Dec. 12, 2013

(51) Int. Cl.
H04M 1/04 (2006.01)
H04M 1/11 (2006.01)
A45F 5/00 (2006.01)

(52) U.S. Cl.
CPC *H04M 1/04* (2013.01); *H04M 1/11* (2013.01); *A45F 5/00* (2013.01); *A45F 2200/0533* (2013.01)
USPC .............................. 379/441; 379/446; 379/454

(58) Field of Classification Search
USPC ............ 379/441, 446, 454; 455/575.1, 575.6; 248/224.7; 224/181; 361/679.55, 361/679.56; 396/423
See application file for complete search history.

(56) References Cited

U.S. PATENT DOCUMENTS

| 3,919,475 | A | 11/1975 | Dukich et al. |
| 4,797,736 | A | 1/1989 | Kloots et al. |
| 4,953,766 | A | 9/1990 | Cruickshank |
| 5,692,661 | A | 12/1997 | Kellerman |
| 5,975,106 | A | 11/1999 | Morgan et al. |
| 6,292,213 | B1 | 9/2001 | Jones |
| 7,519,271 | B2 | 4/2009 | Strub et al. |
| 7,683,969 | B2 | 3/2010 | Callahan |
| 2003/0106918 | A1 | 6/2003 | Hung |
| 2006/0176660 | A1* | 8/2006 | Amiri ........................... 361/683 |
| 2007/0099681 | A1* | 5/2007 | Kielland ..................... 455/575.1 |
| 2010/0054724 | A1* | 3/2010 | Chamberlayne .............. 396/423 |
| 2011/0097069 | A1 | 4/2011 | Braithwaite |

FOREIGN PATENT DOCUMENTS

| DE | 20 2009 009 909 | 11/2009 |
| WO | 2009/095709 | 8/2009 |

OTHER PUBLICATIONS

Search Report and Written Opinion for related PCT Application No. PCT/US2013/043616 dated Oct. 22, 2013.

* cited by examiner

*Primary Examiner* — Tuan D Nguyen
(74) *Attorney, Agent, or Firm* — Husch Blackwell LLP

(57) ABSTRACT

Headgear for mounting a camera or other mobile media device is disclosed. The head gear includes a band for circling the head and means for enlarging or decreasing the diameter of the band to make it adjustable for various head sizes. A head mount is secured to the band for holding the device. The mount includes an enclosure with a flap for closing a pocket. The flap is secured to the mount proximate the head and folds over the front of the mount and is secured thereto to maintain the device in the pocket. The front of the pocket contains openings which are aligned with the lens of the held device to focus and record events in front of the user. The pocket has hinged side panels to allow expansion and contraction, caused by a bladder within, so that the camera may be pointed at a desired angle by the mount, thereby achieving the desired angle of view of the camera.

6 Claims, 3 Drawing Sheets

MOUNT FOR A MOBILE MEDIA DEVICE

FIELD OF THE INVENTION

This invention relates to a mounting device for a mobile media device such as a phone that can capture video hands-free.

BACKGROUND OF THE INVENTION

Cameras and other imaging devices have significantly reduced in size making them lighter, more compact and easier to store and carry. As a result, recording everyday activities of people has grown exponentially so that they are now a major factor in such diverse activities as regime change, law enforcement and recreational activities.

As a result of this expanded interest, it is now desirable to find a means for mounting a camera or other mobile media device so that it might take photographs or video on a hands-free basis.

SUMMARY OF THE INVENTION

The subject invention includes headgear for mounting a camera or other mobile media device. The head gear comprises a band for circling the head and means for enlarging or decreasing the diameter of the band to make it adjustable for various head sizes. In accordance with the present invention there is a head mount secured to the band for holding the device. The mount includes an enclosure with a flap for closing a pocket. The flap is secured to the mount proximate the head and folds over the front of the mount and is secured thereto to maintain the device in the pocket. The front of the pocket contains openings which are aligned with the lens of the held device to focus and record events in front of the user. The pocket has hinged side panels to allow expansion and contraction, caused by a bladder within, so that the camera may be pointed at a desired angle by the mount, thereby achieving the desired angle of view of the camera.

CONCISE DESCRIPTION OF THE SEVERAL DRAWINGS

DETAILED DESCRIPTION OF THE INVENTION

Figure 1:
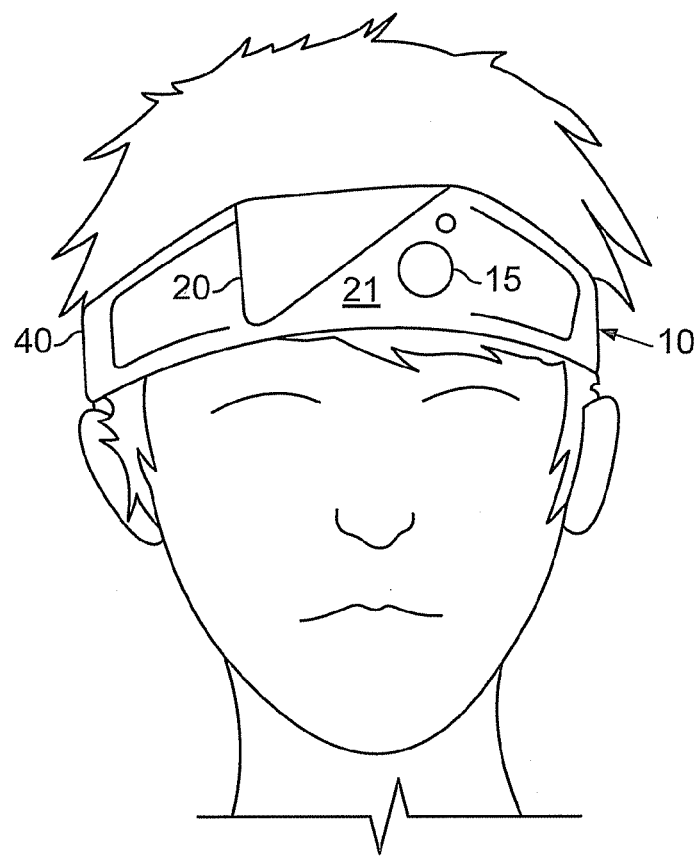
FIG. 1 is a perspective view of a user wearing the multimedia device mount of the subject invention.
Figure 2:
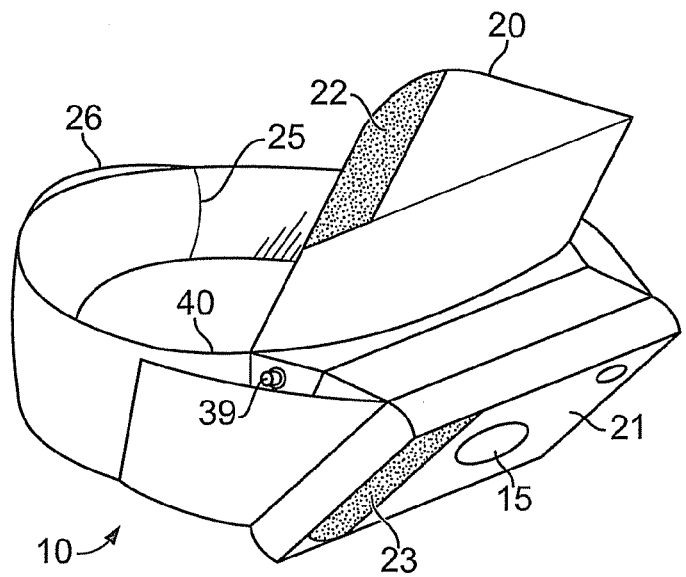
FIG. 2 is a perspective view of the multi-media mount device of the subject invention with the pocket open.

As shown in FIGS. 1 and 2, the subject invention includes a headband 10 which is wrapped around a user's head. The headband 10 has a circumferential strap 40 on which is held a holder or mount 21 for the mobile media device 45. The holder 21 includes a flap 20 and an aperture 15 through which the lens of the mobile media device may have a line of sight. The aperture 15 may be of transparent material, such as glass or plastic. The glass or plastic material may be held in place with adhesive, or if plastic, by stitching. The strap may generally be formed from a suitable synthetic webbing material such as nylon or cotton. The strap body 40 may comprise a continuous loop of material and the support can be held on a user's head by the elastic force of the material. The headband 10, strap 40, and holder 21, may be formed of leather, or plastic such as neoprene. Neoprene gives the device of the subject invention waterproof properties. Other materials may be used to give the subject invention other properties, such as color, wear resistance and the like.

In another embodiment, the strap may include a Velcro ® buckle apparatus (not shown) to allow the strap to be adjustably tightened and held about the user's head, thereby allowing the strap to fit various sized heads.

Figure 3A:
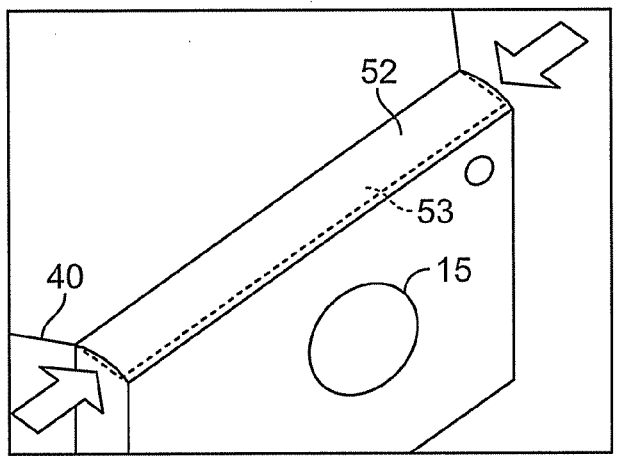
FIG. 3a is a perspective view of the pocket of the multimedia mount device showing the device pocket in the closed position.
Figure 3B:
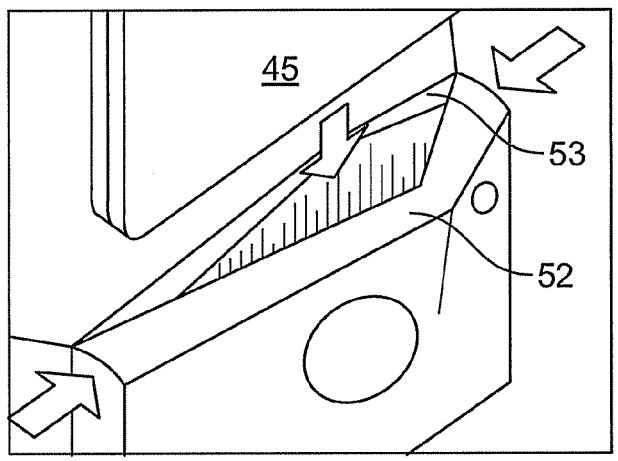
FIG. 3b is a perspective view of the device pocket of FIG. 3a showing the device pocket open for insertion of the device.
Figure 3C:
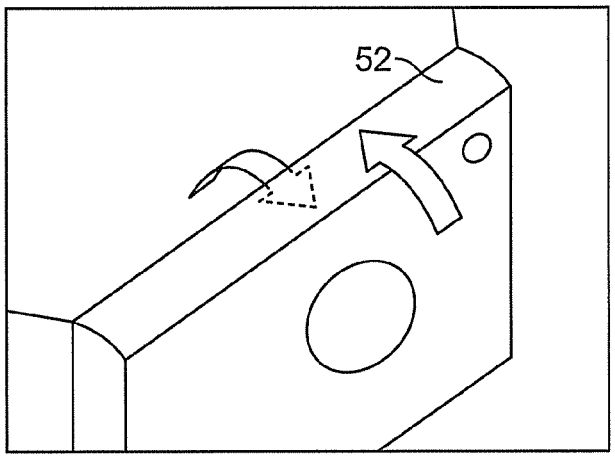
FIG. 3c is a perspective view of the device pocket of FIG. 3a with the device pocket closed.
Figure 4:
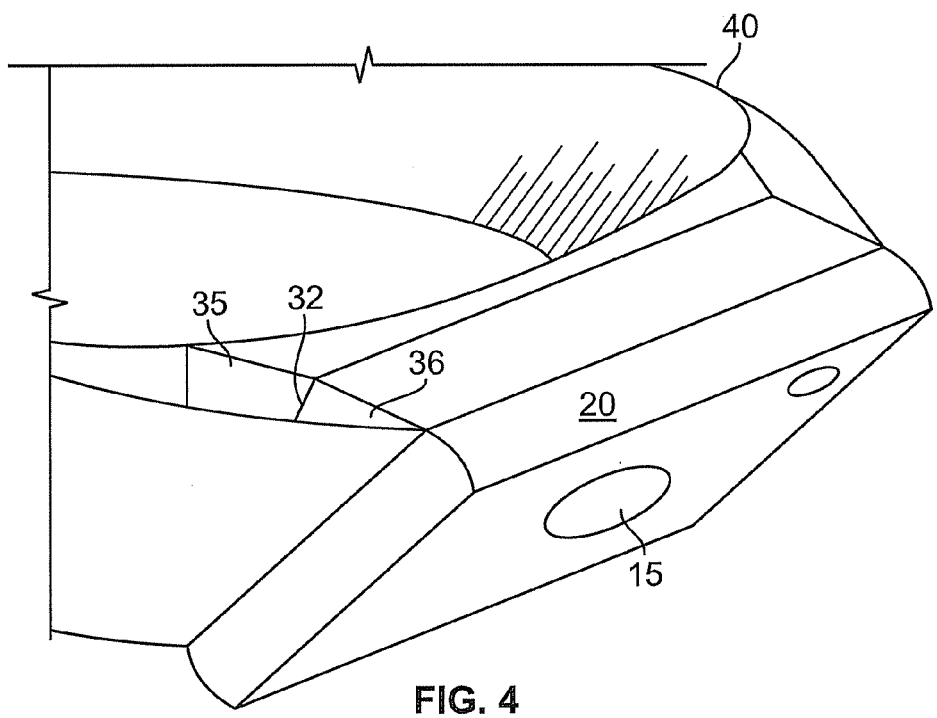
FIG. 4 shows a mount of the subject invention with a positioning bladder compartment within the pocket of the mount.
Figure 5:
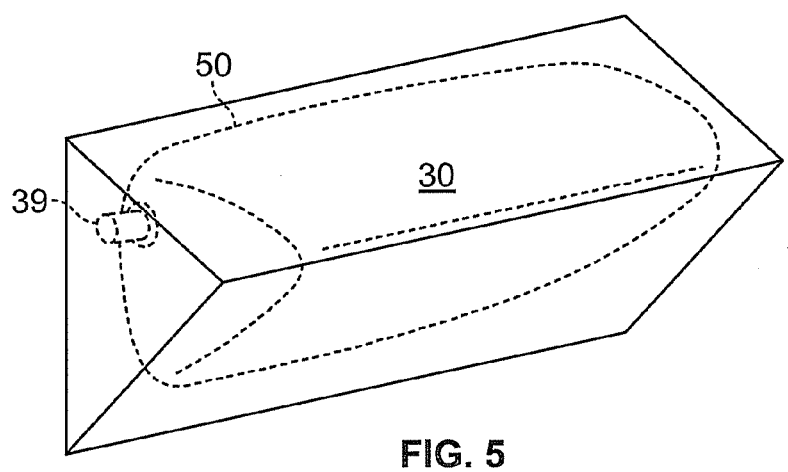
FIG. 5 shows the positioning bladder fully inflated with the pocket.
Figure 6:
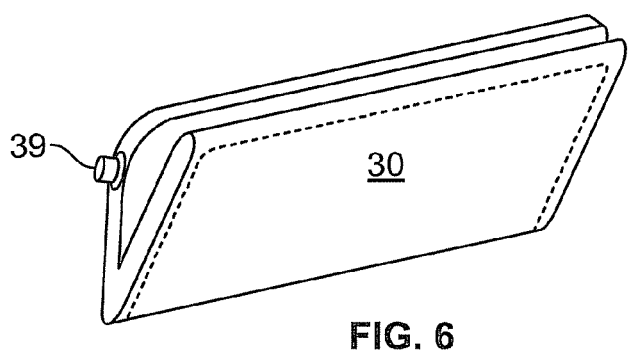
FIG. 6 shows the positioning bladder deflated.

The camera pocket 50 shown in FIGS. 3 and 4 is conformed and secured to the head strap 40. The pocket 50 can be of the same material as the strap 45. A device compartment 51 may be located in the pocket for retention of the device. The compartment 51 (FIGS. 3a, 3b, 3c) may have an opening circumscribed by two opposing and overlapped flaps 52 and 53. By squeezing the ends of the flaps, the device compartment may open as shown in FIG. 3b, to allow insertion of the device 45, after which the flaps are allowed to relax into the closed position shown in FIG. 3c, thereby holding the device securely. A pocket flap 54 may be used to cover the entire pocket, including the device compartment and further secure the device within the pocket. The pocket flaps 20 can have Velcro® or similar hooks and loops attaching means over most of the contact surface, with the same amount of Velcro® on the mating surface of the pocket exterior, thereby providing flexibility for the flap to accommodate different thicknesses of devices and still close tightly and effectively. If neoprene is the material of choice, then the overlapping flaps, in combination with the pocket flap will keep the device within dry.

The pocket has accordion-like hinged side panels secured at a bottom end for pivotal movement, to allow for a variable sizing of the pocket. In this manner the pocket can be flattened or pivoted to a larger size from a minimum flat position to a maximum angled position with the sides fully extended. The accordion-like sides are connected at the front side to a front panel and comprise at least two panels 35 and 36 joined at a hinged area 37 with the bottom of the front panel pivotally attached to the strap 45; thus, when the pocket is compressed, the two panels 35 and 36 angle outwardly along the hinge lines 37 and pivot point 38 to the desired angle. When the pocket is open the panels 35 and 36 flex along the hinge line 37 to the desired angle or until the panels form a 180° angle to one another at maximum opening.

When in use, the mobile media device is slipped into the pocket and secured by flaps 52 and 53. A bladder 30, is positioned in the pocket and inflated or deflated to achieve the desired angle of the device. The flap head 20 is secured over the bladder 30 and device pocket onto a fastener on the front side of the pocket, thereby securing the camera in the pocket at the desired angle. The fastener may be Velcro®, snaps or any other suitable fastener. The bladder is equipped with a valve 39 to allow adjustment of the air pressure within the bladder and thus the angle of the camera with respect to horizontal. In such a manner the camera may be pointed at any desired angle straight ahead (horizontal or 0°) to straight down (vertical or 90°) and preferably 0°-30°. A vertical position would require wider panels to achieve the distance necessary to allow the device to lay flat. As a result, the line of sight of the camera of the mobile media device can be aimed as desired with the line of sight varied by using different inflation pressure in the bladder.

The bladder may have a valve that is manually activated to let air out. Air may be introduced into the bladder by squeezing a bulb that may be attached to the bladder through the valve. Thus the air pressure and the size of the bladder may be increased, and by increasing and decreasing the size of the bladder through the increase and decrease of the air pressure in the bladder the angle of the device in the pocket may be controlled, thereby controlling the angle of view of the device.

In another embodiment the bladder may comprise memory foam, i.e., visco-elastic polyurethane foam. Such foam may be manually squeezed to push the air out, whereupon the valve is closed to maintain the bladder at a desired size. When the valve is opened, the memory foam will reacquire the air and return to its original size or whatever intermediate size is desired through the controlled air input of the valve.

The mobile media device amount of the subject invention may be used in conjunction with or as a integral part of a cap or hat as desired.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

The invention claimed is:

1. A mount for a mobile media device comprising a pocket secured to a strap, said pocket having an aperture on a front panel aligned with a lens of the mobile media device and a flap for retention of the mobile media device in the pocket; said pocket being formed by a first set of adjacent panels and a second set of adjacent panels with an intermediate front panel, said front panel being pivotally secured at a bottom edge for travel of said front panel in an arc about said bottom edge, and said first and second set of adjacent panels being pivotal about a first and second hinge, respectively, and capable of pivotal movement about each of said first and second hinges to vary the size of said pocket, said first and second set of adjacent panels cooperating to adjust the vertical angle of said front panel, said pocket including a bladder, said bladder being variable in size.

2. The mount of claim 1 wherein the strap is supported by the head of a user.

3. The mount of claim 1 wherein the strap is supported by the chest or shoulders of a user.

4. The mount of claim 1 wherein said bladder has a valve for increasing or decreasing the air pressure within the bladder.

5. The mount of claim 1 wherein the variation in size of the bladder changes the angle of view of the mobile media device.

6. A mount for a camera in a mobile media device, comprising a pocket secured to the head of a user whereby the pocket is formed by at least two side panels, each of said side panels attached on one side to a front panel, the side panels each comprising at least two adjacent panels pivotable about a longitudinal hinge line, the pocket including a bladder that is variable in size, thereby expanding or contracting the pocket as the bladder is expanded or contracted and adjusting the vertical angle of the front panel.

* * * * *